Figure 1:
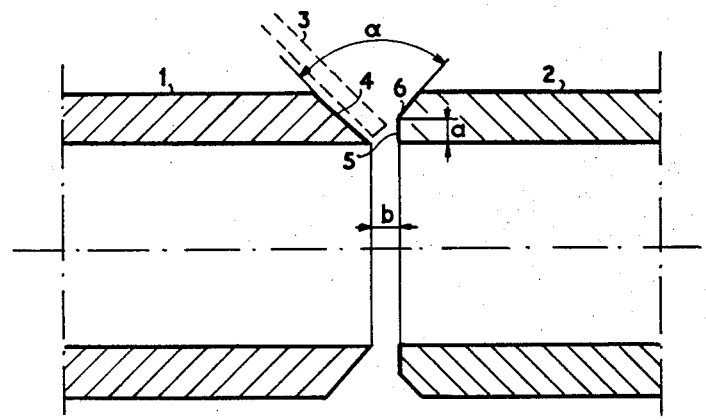

Patented May 8, 1951

2,552,468

UNITED STATES PATENT OFFICE 2,552,468

PROCESS FOR THE ELECTRIC WELDING OF TUBES AND THE LIKE

Wilhelmus H. Vosters, Geleen, Netherlands, assignor to De Directie van de Staatsmijnen in Limburg, handelend voor en namens den Staat der Nederlanden, Heerlen, Netherlands Application March 31, 1949, Serial No. 84,591
In the Netherlands April 8, 1948

5 Claims. (Cl. 219—10)

This invention relates to a process for the electric welding of tubes and the like.

When cylindrical work pieces such as tubes and the like are to be electrically butt welded and no counter seam can be deposited on the inner surface of the work piece, a backing ring is inserted into the members at the spot where the weld is to be made by which the formation of a welding burr in the interior of the work piece is prevented and a proper adhesion of the first layers is obtained. The ends of the tubes are provided with a bevelled edge on which the welding material is deposited. The first beads will connect the backing ring with the bevelled ends, after which, as the welding proceeds, the entire groove will be filled up with the deposited welding material.

A proper weld will only be obtained if the entire diameter of the backing ring makes a proper metallic contact with the adjacent ends of the tubes. The deviations of the inner diameter and the unroundness of the tubes however, are such that in the construction of pipe lines this contact cannot be realised, while moreover in this case the tubes to be connected can usually not be accurately centered and positioned exactly coaxially with respect to each other so that the ring may be put in an oblique position in the ends of the tubes, which will result in a bad welding on the inner surface.

A further drawback attached to the application of backing rings is due to the fact that at the place of the weld the diameter of the tube is restricted so that the resistance of flow is increased. This is particularly undesirable when long pipe lines are concerned such as gas pipes, oil lines or water pipes as in this case the increased resistance will result in a considerable loss of energy which is expressed by the necessary increase of the compressor or pump pressure. Moreover this method offers the disadvantage that a narrow slot is left open between the ring and the inner surface of the tube, which in the long run will lead to corrosion and notch sensitivity.

Therefore suggestions have already been made for welding the tubes without the help of a backing ring to the effect that the first layers are welded autogeneously and electric welding is applied for the other layers. (Welding 1945, page 389.)

This process is rather expensive, while considerably more time is required for welding and favourable results are not always obtained.

Now it has proved that also without making use of a backing ring a very good connection can be obtained and no welding burr is formed when one end of the members to be connected is provided with a deeper bevelled edge than the other end. As a result hereof the electrode consumption decreases considerably viz. to appr. ⅔ of the consumption in the process applied hitherto, while also the welding time is considerably reduced. Moreover only one root has to be welded. When a backing ring is applied it is always necessary to weld a double root, since in this method one root would lead to cracking of the weld.

One end is preferably bevelled almost as far as the inner diameter of the tube, whereas the other end is bevelled so far that a flat ring is left, the width of which is at least equal to the effective diameter of the welding electrode to be used.

The invention will be further elucidated with the help of the drawing. In this drawing, Fig. 1 represents two cylindrical work pieces, which must be electrically butt welded, a tube section according to the invention being illustrated in Fig. 2.

The righthand end of the section 1 has been bevelled as far as the inner diameter in the normal manner. The opposite end of the member 2 which must be welded to the former is bevelled less deep so that the front view shows a flat ring 5, having a width $a$. Before welding is started the two tubes are set at a certain distance $b$ from each other. During welding, the electrode 3 is kept in an inclined position, approximately parallel to the bevelled end of the section provided with the deeper bevelled edge, as indicated by the dashed line in Fig. 1: The tip of the electrode is directed towards the flat plane 5, where the greatest amount of tube material is present.

As a result hereof a stable flame arc will be formed between said plane and the electrode, by which the thick end of the member 2 is immediately melted, while simultaneously the thin sharp end of the member 1 is melted indirectly. In this manner a very fine fusion of the two members and the welding material is obtained, while no molten material will penetrate through the slot $b$, so that the formation of a welding burr is prevented. On the inside an excellent, slightly convex root is formed.

The bevelled edge 6 serves for giving the welder a proper view of his work.

Excellent results are obtained with an electrode with a diameter of 2.5 mm., when the distance $a$ amounts to approximately 3 or 4 mm. The distance $b$ usually amounts to approximately 2 mm., while the normal measure of approximately 70° may be used for the angle $a$.

It is obvious to bevel both tube ends under the same angle. It is also possible however, to use different angles for the two bevelled edges.

Figure 2:
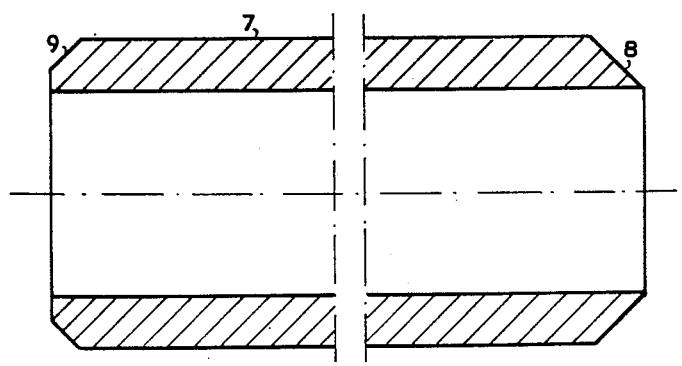

The tube section 7, shown in Fig. 2, serves for the construction of pipe lines by butt welding a number of similar tube sections together. For this purpose the two ends have been bevelled in such a manner that the one end 8 has been bevelled deeper than the other one 9. If these tube sections are used, the tubes need not be sorted when a pipe line is laid. One has only to take care that the longer bevelled edge of the one tube is welded to the shorter bevelled edge of the other tube. The process according to the invention may also be applied however, to the laying of pipe lines by using two types of tubes, namely one type which on either end is bevelled almost as far as the inner diameter and one type which on either side is provided with a less deeper bevelled edge. In this case, however, the tubes of the one type must be welded to those of the other type in order to obtain a welding groove according to Fig. 1. For this reason it is necessary in this case to sort the tubes beforehand.

I claim:

1. In the joining of conductive members by butt welding, the method which comprises forming the edge of one member to present a continuous bevel substantially across the said edge, forming the edge of a second member to present a bevel only across a portion of the said edge, the remaining portion of the just-mentioned edge remaining substantially unbeveled, placing the edges in approximate butt relationship with the bevels diverging in the same direction, and welding the members together while in such position, the said unbeveled remaining portion of the second member permitting liquid weld metal to fuse between the said remaining portion and the continuously bevelled edge.

2. In the joining of conductive members by welding, the method which comprises forming the edge of one member to present a continuous bevel substantially across the said edge, forming the edge of a second member to present a bevel only across a portion of the said edge, the unbeveled portion of the said adjoining edge being at least equal to the effective diameter of the welding electrode, placing the edges in approximate butt relationship with the bevels diverging in the same direction, and welding the members together while in such position.

3. In the joining of conductive cylindrical members by butt welding adjacent edges of the members, the method which comprises forming the edge of one member to present a bevel substantially coextensive with the dimension of the edge, forming the adjacent edge to present a bevel substantially less than the dimension of the edge, and establishing the welding arc between the welding electrode and the unbeveled portion of the said adjoining edge, whereby the edge of the one member is heated indirectly to prevent excessive fusing thereof.

4. In the joining of conductive cylindrical members by butt welding adjacent edges of the members, the method which comprises forming the edge of one member to present a bevel substantially coextensive with the dimension of the edge, forming the adjacent edge to present a bevel substantially less than the dimension of the edge, the unbeveled portion of the said adjoining edge being at least equal to the effective diameter of the welding electrode, and establishing the welding arc between the welding electrode and the unbeveled portion of the said adjacent edge, whereby the edge of the one member is heated indirectly to prevent excessive fusing thereof.

5. In the joining of conductive members by butt welding, the method which comprises forming the edge of one member to present a continuous bevel substantially across the said edge, forming the edge of a second member to present a bevel only across a portion of the said edge, the remaining portion of the just-mentioned edge remaining substantially unbeveled, placing the edges in approximate butt relationship with the bevels diverging in the same direction, and welding the members together while in such position, the said remaining unbeveled portion providing clearance between the continuous beveled edge and the unbeveled edge to permit direct heating of the unbeveled edge by the welding arc.

WILHELMUS H. VOSTERS.

REFERENCES CITED

The following references are of record in the file of this patent:

UNITED STATES PATENTS

| Number | Name | Date |
| --- | --- | --- |
| 1,977,678 | Kidd | Oct. 23, 1934 |
| 2,363,828 | Anderson | Nov. 28, 1944 |
| 2,467,311 | Hudson | Apr. 12, 1949 |

OTHER REFERENCES

"Steel," May 12, 1941, page 83.